US005528437A

United States Patent [19]
Mastache

[11] Patent Number: 5,528,437
[45] Date of Patent: Jun. 18, 1996

[54] ROTARY INERTIA LATCH FOR LATCHING A ROTARY ACTUATOR IN A DISK DRIVE

[75] Inventor: Mark D. Mastache, Boise, Id.

[73] Assignee: Hewlett-Packard Company, Palo Alto, Calif.

[21] Appl. No.: 359,719

[22] Filed: Dec. 20, 1994

Related U.S. Application Data

[63] Continuation of Ser. No. 124,901, Sep. 21, 1993, abandoned.

[51] Int. Cl.$^6$ .............................. G11B 5/54; G11B 21/22
[52] U.S. Cl. .................................................. 360/105
[58] Field of Search ...................................... 360/105, 106

[56] References Cited

U.S. PATENT DOCUMENTS

| | | | |
|---|---|---|---|
| 5,208,713 | 5/1993 | Lindsay | 360/105 |
| 5,296,986 | 3/1994 | Morehouse et al. | 360/105 |

Primary Examiner—Robert S. Tupper

[57] ABSTRACT

A shock resistant disk drive has a balanced rotary actuator and a disk assembly rotatably mounted to its base. The rotary actuator is latched with its transducer in a parked position relative to the disk assembly, by a monostable balanced rotary inertia latch, also rotatably mounted to the base, which in its monostable latched position is torque coupled in torque opposition to said rotary actuator in parked position. The balanced rotary actuator and the balanced rotary inertia latch, being rotatably mounted to the base, respond to rotary shock in the same rotational sense. The moment of inertia of the balanced rotary inertia latch and the ratio of the opposed torque moment arms in the torque couple are chosen so that in the presence of rotary shock on said base, rotation of said balanced rotary actuator relative to said base and rotation of said balanced rotary inertia latch relative to said base, is zero. A permanent magnet bias is employed to retain the balanced rotary inertia latch in monostable latched position. When the disk assembly is at operating speed and the transducer is stabilized in flight on the disk air bearing, the balanced rotary inertia latch is electromagnetically biased to its unlatched position, in which position the inertia latch is clear of the balanced rotary actuator.

11 Claims, 2 Drawing Sheets

ROTARY INERTIA LATCH FOR LATCHING A ROTARY ACTUATOR IN A DISK DRIVE

This is a continuation of application Ser. No. 08/124,901, filed on Sep. 21, 1993, now abandoned.

TECHNICAL FIELD

This invention relates to a shock resistant rotary actuator type of disk drive having a balanced rotary inertia latch for latching the rotary actuator in a parked position relative to the disk.

Background of the Invention

Numerous efforts have been made to devise satisfactory actuator latches for disk drives. These include air vane operated actuator latches and solenoid operated actuator latches. These actuator latches are usually monostable latches which have a fixed force bias applied which holds the latch in the latched position. The fixed force bias is applied, in typical cases, by a spring or a permanent magnet. Thus, at any time the rotary actuator is moved to its parked position, a latch element engages the rotary actuator to hold it in the locked position. Typical latch designs are not shock resistant and require a substantial biasing force to hold the latch element in latched position in the presence of shock. To release such a latch it is necessary to employ an equally strong releasing force. When this releasing force is provided by electromagnetic means, the electrical energy requirement during hours of operation of the drive, is significant.

To minimize electrical energy requirements, attempts have been made employing air vanes disposed between the disks to obtain releasing forces of sufficient magnitude to release the latch element, at least when the disks are at their operating speed. Air vane operated latch mechanisms are usually unsatisfactory in environments in which the disk drive is subject to shock and/or is of small form factor.

Patentees such as Dimmick et al, U.S. Pat. No. 4,538,193, Westwood, U.S. Pat. No. 4,647,997, Campbell, U.S. Pat. No. 4,692,829 and Mastache, U.S. Pat. No. 5,036,416, utilize air flow moving with the disks between the disks to operate air vanes on fixed force biased latches, to release the latches, as the disks accelerate to operational speeds in rotation.

Patentees such as Hattori et al, U.S. Pat. No. 4,706,142 and Chang, U.S. Pat. No. 4,796,131 employ a solenoid to withdraw the latch member such as a pin or an arm to release the actuator from latched position.

The patentees Pollard et al, U.S. Pat. No. 5,012,372 present the mechanical details of an actuator latch mechanism, in which a stop pin on the actuator is trapped between a crash stop face and a confronting face on a latch arm, the latch arm being movable to engage and release the stop pin.

The patentees Kelsic et al, U.S. Pat. No. 5,023,736 describe an actuator or carriage latch which, like Pollard et al, is incorporated with the crash stop. In latched position, a latch actuator plate on the actuator or carriage engages a permanent magnet on the crash stop to hold the rotary actuator at the crash stop.

Latch mechanisms of the type described in the referenced patents, while being acceptably functional in static physical environments, are usually not designed with consideration for the impact of rotary shock on the respective mechanisms. Mechanical shock is a common occurrence in portable personal computers, for example. In such circumstances, it is important that the disk drive be designed to be resistant to mechanical shock whether the shock be linear or rotary in character.

Disk drives employing balanced rotary actuators are insensitive to linear shock acting in any direction with respect to the axis of rotation of the rotary actuator. The balanced rotary actuator disk drive, however, is not insensitive to rotary shock. Rotary shock for present purposes is defined to be the application of force to a body in such a way as to produce rotary or angular acceleration of the body.

In this respect, note patents such as that to Campbell, for example, disclosing the air vane type of actuator latches. These are rotary actuator latches. Although not so taught, it may be argued that each is balanced about its latch axis. The requirement for air vane area, however, almost negates such a possibility. In the presence of rotary shock, however, these latches, due to their rotary inertia, may overcome fixed force biases and be dislodged from latched position, releasing the rotary actuator. Similar general considerations apply to other types of fixed force bias actuator latches.

SUMMARY OF THE INVENTION

This invention provides improvement over prior fixed force biased latches for rotary actuator disk drives in the provision of a monostable inertia latch including a balanced rotary inertia latch which is mounted on the disk drive base or support for rotation about a latch axis. The balanced rotary actuator arm assembly is similarly mounted on the disk drive base or support for rotation about its actuator axis. Each of the inertia latch and the rotary actuator arm assembly is balanced about its axis of rotation and, being mounted upon the disk drive base or support, are subject to the same shock forces that impact the disk drive base or support. Since each is balanced about its axis of rotation, shock forces which do not rotate the disk drive support do not cause rotation of either the rotary inertia latch or the rotary actuator arm assembly. Due to the fact that both the balanced rotary inertia latch and the balanced rotary actuator arm assembly have mass, they tend not to rotate in the presence of shock which rotates the disk drive support, but rather, each tends to remain angularly fixed in space about its axis.

When the disk drive is not in use, the balanced rotary actuator arm assembly is positioned with a transducer on the distal end of the actuator arm in a landing zone in contact with the disk adjacent the hub of the disk. The balanced rotary inertia latch in latched position has a latch arm which projects toward the balanced rotary actuator arm assembly. The balanced rotary actuator arm assembly has a torque arm which projects towards the balanced rotary inertia latch. The distal ends of these arms overlap. Each distal end has a bearing point. When the balanced rotary inertia latch is in latched position and the balanced rotary actuator arm assembly is in parked position these bearing points are in contact.

In the presence of angular acceleration of the disk drive support, in a direction tending to cause relative displacement between the balanced rotary actuator arm assembly in parked position and the disk, the distal end of the torque arm moves in one direction and the distal end of the latch arm moves in an opposite direction. With the bearing points of the respective arms in contact and assuming that the latch arm force at the bearing points is equal to and opposite to the torque arm force at the bearing points, it will be appreciated that there will be no rotation of either the balanced rotary inertia latch or the balanced rotary actuator arm assembly with respect to the disk drive support. Thus, by balancing each of the rotary inertia latch and the rotary actuator arm assembly about its axis and by mechanically coupling the balanced rotary inertia latch to the balanced rotary actuator arm assembly via the latch arm and the torque arm, respectively, a disk drive is provided which is relatively insensitive to both linear and rotary shock forces.

Force balance is achieved by the simple expedient of selecting the moment of inertia of the balanced rotary inertia latch as the product of the moment of inertia of the balanced rotary actuator arm assembly and the ratio of the length of the latch moment arm to the length of the torque moment arm. Thus, the energy of the shock which is applied to the disk drive support, in effect, is used to prevent relative displacement between the disk and the balanced rotary actuator arm assembly. No external biasing forces are required to achieve this end.

Now, to provide a monostable inertia latch arrangement, only a small amount of fixed force bias is required to bias and to maintain the balanced rotary inertia latch in a latched position. A permanent magnet bias is provided for this purpose. To move the balanced rotary inertia latch from latched position to an unlatched position to release the balanced rotary actuator arm assembly for operation, a coil on the monostable inertia latch is employed. Typically, this coil is energized after the disk(s) are brought to operating speed and the disk drive is ready for operation. At this point, the application of a small amount of electrical energy to the coil results in rotation of the balanced rotary inertia latch from its magnetically biased latched position to an unlatched position. Here, again, it will be observed that as the balanced rotary inertia latch rotates from latched position, the gap in the permanent magnet biasing circuit is increased which decreases the permanent magnet pull. Thus, the field force required to hold the latch in an unlatched position is reduced and is minimal and the electrical energy may be reduced when the inertia latch is in unlatched position which conserves electrical energy during operation of the disk drive.

BRIEF DESCRIPTION OF THE DRAWINGS

The invention will be understood by reference to the following specification when considered in conjunction with the accompanying drawings in which.

DESCRIPTION OF THE PREFERRED EMBODIMENT

Figure 1:
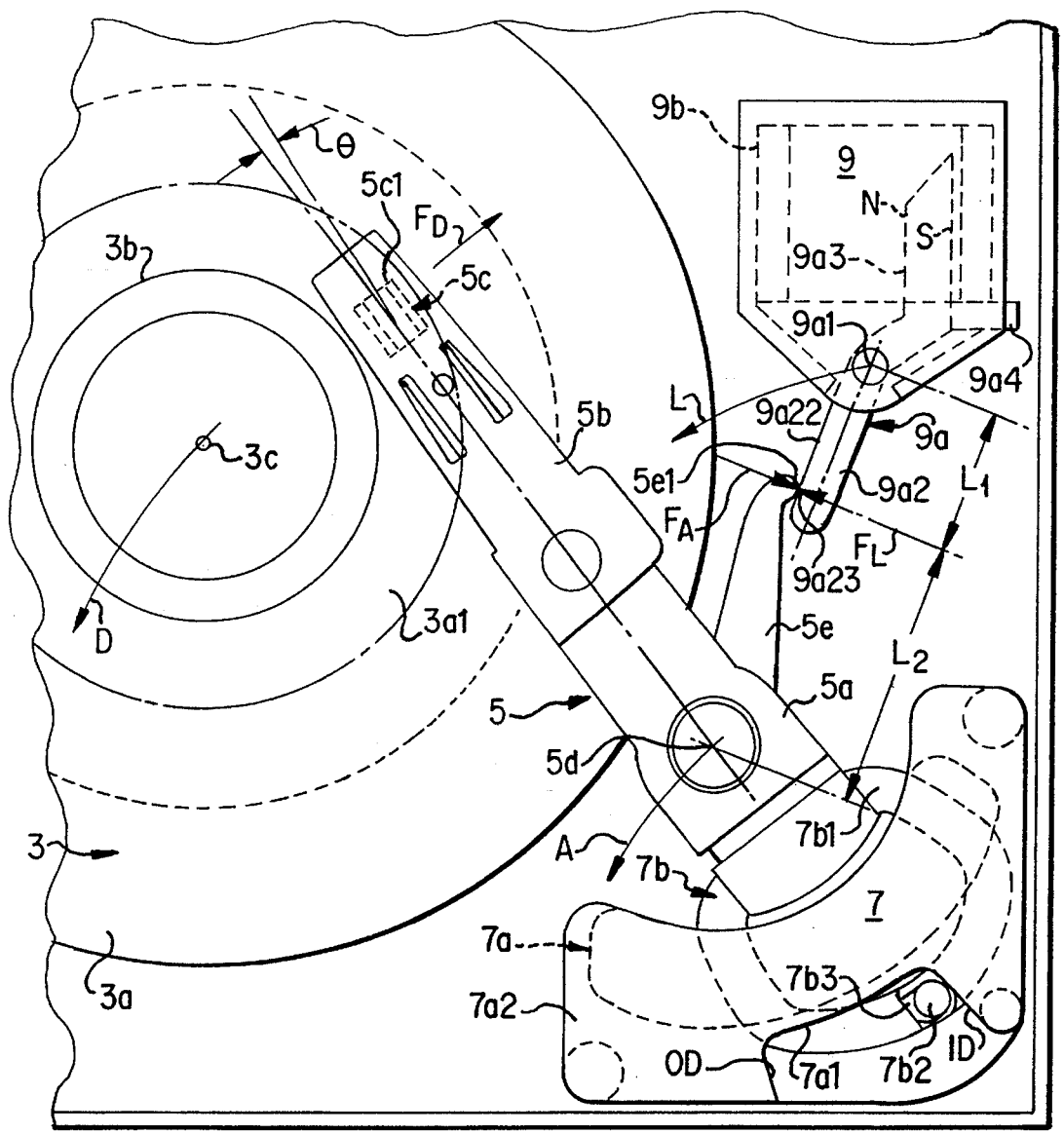
FIG. 1 is a plan view of a rotary actuator disk drive having a balanced rotary inertia latch embodying the principles of this invention.

The disk drive illustrated in FIG. 1, is a rotary actuator type of disk drive. It comprises a disk drive base or support 1, usually of stainless steel or aluminum. A disk assembly 3, comprising at least one disk 3a and a disk hub 3b is rotatably mounted to the support 1 for rotation about a disk spindle axis 3c. A balanced rotary actuator arm assembly 5 comprises a rotary arm structure 5a, at least one beam 5b, a transducer 5c on the distal end of the load beam 5b and an axial gap actuator motor 7. The rotary arm structure 5a of the rotary actuator arm assembly 5 is rotatably mounted to the support 1 for rotation about an actuator spindle axis 5d. The axial gap actuator motor 7 comprises a permanent magnet stator 7a mounted to the support 1 and an armature 7b mounting a coil 7b1. The armature 7b is mounted to the rotary arm structure 5a on the side of the actuator spindle axis 5d, substantially diametrically opposite to the load beam (s) 5b, in which position the coil 7b1 swings in an arc, in a plane, in the permanent magnet field of the permanent magnet stator 7a.

Figure 3:
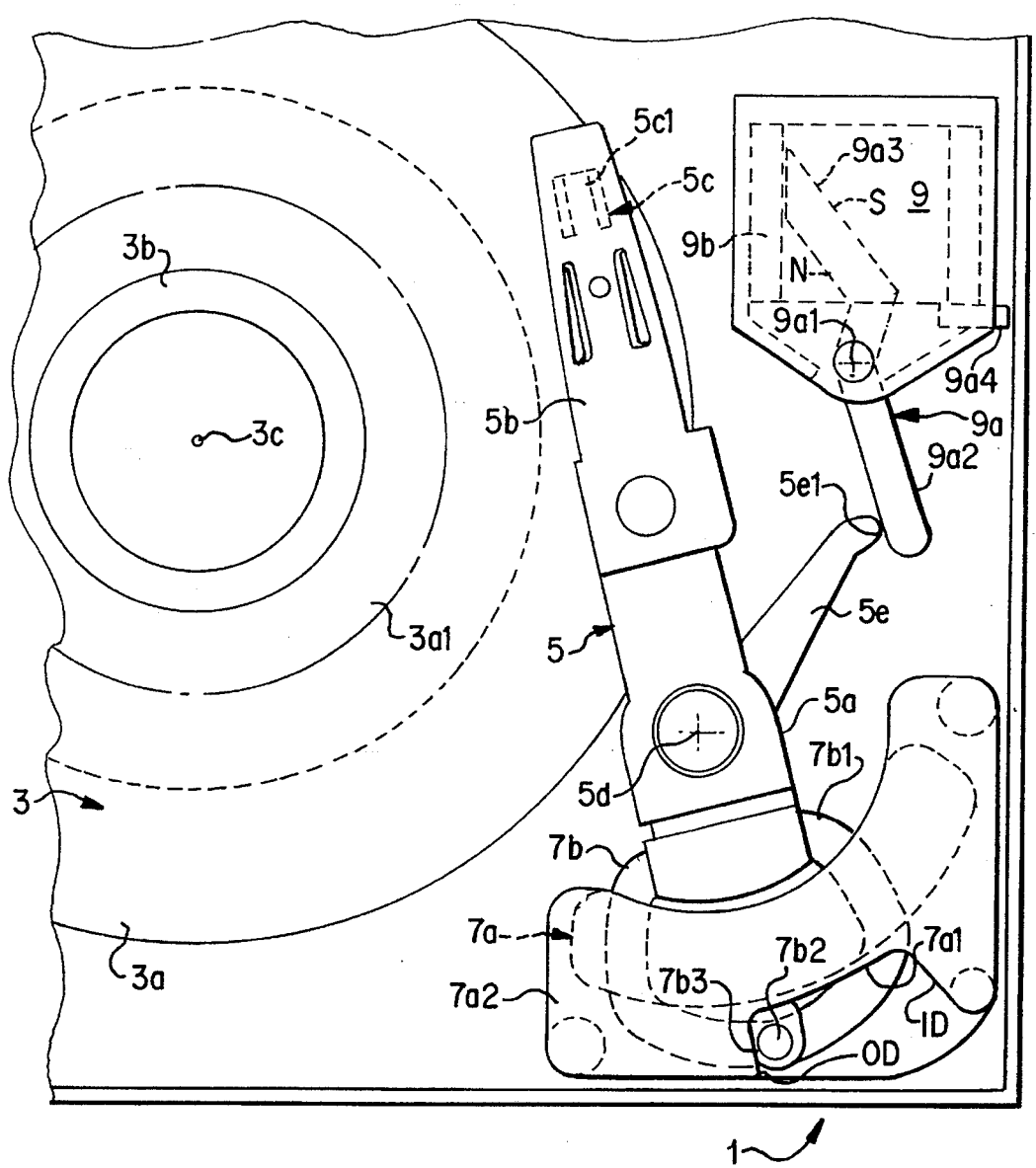
FIG. 3 is a plan view of the disk drive of FIG. 1, with the balanced rotary inertia latch in unlatched position.

The balanced rotary actuator arm assembly 5 is disposed in its parked position with the transducer 5c in contact with the disk 3a in a landing zone 3a1 adjacent a disk hub 3b. In this position, a stop pin 7b2 mounted to the armature 7b is in contact with an inner diameter limit stop face ID on one side of an arcuate recess 7a1 in a top plate 7a2 of the permanent magnet stator 7, the other side of the arcuate recess 7a1 being defined by the outer diameter limit stop face OD. These limits stop faces ID and OD, when engaged by the limit stop pin 7b2 define the inner and outer mechanical limits, ID and OD of angular movement of the balanced rotary actuator arm assembly 5, as seen in FIGS. 1 and 3.

If the limit stop pin 7b2 is of magnetic material, it is attracted to either of the limit stop faces, ID or OD in these limits of movement. It is desired, however, to restrain or latch the balanced rotary arm actuator assembly 5 only in the parked position seen in FIG. 1, which is the inner diameter mechanical limit ID. To avoid latching of the rotary actuator 5 in the outer diameter mechanical limit position, OD, seen in FIG. 3, a limit stop bumper 7b3 of non-magnetic material, is applied to the side of the limit stop pin 7b2 confronting the limit stop face OD.

According to conventional practice, in operation, the disk assembly 3 is rotated at constant speed. At operational disk speed, the transducer 5c flies on the air film, called an air bearing, moving with the disk 3a at the disk surface. When the flight of the transducer 5c is stabilized, the actuator coil 7b1 is energized to rotate the balanced rotary actuator arm assembly to move the transducer 5c from parked position in the landing zone 3a1. Selective directional energization of the coil 7a1 produces bi-directional angular displacement of the balanced rotary actuator arm assembly 5 to move and place the transducer 5c at different radial locations on the disk 3a in track seeking, track following modes, respectively, as is well known.

A monostable inertia latch 9 for latching the balanced rotary actuator arm assembly 5 in the parked position, seen in FIG. 1, has a balanced rotary inertia latch 9a rotatably mounted to the support 1 for rotation about a latch axis 9a1. The balanced rotary inertia latch 9a comprises a latch arm 9a2 and a control arm 9a3, substantially diametrically disposed of the latch arm 9a2 with respect to the latch axis 9a1.

As seen in FIG. 1, the latch arm 9a2 has a bearing surface 9a22 on one side. A torque arm 5e on the balanced rotary actuator arm assembly, has a bearing point 5e1 which engages a bearing point 9a23 on the bearing surface 9a22 on the latch arm 9a2. This coupling of the latch arm 9a and the torque arm 5e defines respective moment arms L1 and L2, the latch moment arm and the torque moment arm respectively. Thus, as seen in FIG. 1, the balanced rotary actuator arm assembly 5 is in parked position with respect to the disk assembly 3 and, as will be seen, is inertially latched in that position by bearing point engagement of the torque arm 5e with the latch arm 9a2 of this monostable inertia latch 9.

The control arm 9a3 of the balanced rotary inertia latch 9a comprises a permanent magnet which has its north, N, and south, S, magnetic poles on opposite sides of the control arm 9a3. A keeper 9a4 of magnetizable material holds the balanced rotary inertia latch 9a in latched position, this is the position which is seen in FIG. 1. The keeper 9a4 is adjustable longitudinally, toward and away from the control arm 9a3, to control the latched retention force acting on the control arm 9a3 for the purpose of providing a force $F_L$, acting to the left as seen in FIG. 1 at the bearing point 9a23 on the latch arm 9a2 which balances the force $F_A$, acting to the right, at the bearing point 5e1 on the torque arm 5e, due to static friction and skating forces acting at the transducer 5c, in contact with the disk, when the disk begins to rotate in a counterclockwise direction.

A coil 9b has a coil axis substantially paralleling the longitudinal axis of the control arm 9a3. When the coil is energized, the electromagnet field within the coil is poled substantially at right angles to the permanent magnet field of the control arm 9a3 when the control arm is in latched position. When the coil 7b1 is energized, its electromagnetic field, coupled to the permanent magnet field of the control arm 9a3, exerts a torque couple on the balanced rotary inertia latch 9a about the latch axis 9a1, trying to align the permanent magnet field with the electromagnetic field. This rotates the balanced rotary inertia latch 9a to the position seen in FIG. 3, see also the dotted line outline in FIG. 2, releasing the latch arm 9a2 from the torque arm 5e and clearing the latch arm 9a2 from the torque arm 5e throughout the range of angular movement of the balanced rotary actuator arm assembly 5. This is the position of the parts during operation of the disk drive.

The disk drive thus configured restrains the balanced rotary actuator arm assembly 5 in parked position, as seen in FIG. 1, in the presence of mechanical shock, linear or rotary, and in the presence of static friction and skating forces.

Linear Mechanical Shock

As described, the balanced rotary actuator arm assembly 5 and the balanced rotary inertia latch 9a are balanced about the latch axis, 5d and the actuator axis 9a1. Shock forces coupled to the disk drive support 1, which accelerate and translate, but do not rotate, the support are coupled to the balanced rotary actuator arm assembly 5 and to the balanced rotary inertia latch 9a via each axis. Since the actuator and the latch are balanced, no rotation takes place.

Rotary Mechanical Shock

Neglecting friction and skating forces at the transducer 5, assuming that the disk is not rotating and further assuming that a shock force $F_s$ acting in the plane of the drawing, is coupled to the lower right corner of the disk drive support 1, as seen in FIG. 1, causes rotary acceleration and consequent angular displacement of the disk drive support in a counterclockwise direction, the disk spindle axis 3c of the disk assembly 3, the actuator axis 5d of the balanced rotary actuator arm assembly 5 and the latch axis 9a1 of the balanced rotary inertia latch 9a are arcuately displaced in a counterclockwise direction. Thus there is a component of counterclockwise rotation, D, A and L, respectively, about each axis. Each of the disk assembly 3, the balanced rotary actuator arm assembly 5 and the balanced rotary inertia latch 9a, having mass, exhibit angular space rigidity and tend not to rotate with the disk drive support 1. Thus, angular acceleration of the disk drive support 1 tends to cause an angular displacement between the support 1 and each of the balanced rotary actuator arm assembly 5 and the balanced rotary inertia latch 9a in the same rotational direction, A and L. Since the torque arm 5e and the latch arm 9a2 project into engagement at the bearing points 5e1 and 9a23, in opposite directions from their respective axes the respective forces $F_A$ and $F_L$, at the bearing points 5e1 and 9a23, are in opposition. By selecting the moment of inertia $I_L$ of the balanced rotary inertia latch to be equal to the product of the moment of inertia $I_A$ of the balanced rotary actuator arm assembly 5 and the ratio of the latch moment arm $L_1$ to the torque moment arm $L_2$, the force $F_L$ balances the force $F_A$ and rotation is zero. Thus without the addition of external control over the balanced rotary actuator latch 9a and the use only of the forces resulting from rotary acceleration of the disk drive support caused by rotary shock, the balanced rotary actuator arm assembly 5 is retained in latched or parked position.

The following analysis is explanatory:

$\Sigma M_A = I_A \alpha - L_2 F_L$ $\Sigma M_B = I_B \alpha - L_1 F_A$

Since the sum of the moments $M_A$ and $M_B$ are each equal to zero:

$I_A \alpha = L_2 F_L$ and $I_B \alpha = L_1 F_A$

Solving for the forces.

$$F_L = \frac{I_A \alpha}{L_2}$$

and $$F_A = \frac{I_B \alpha}{L_1}$$

For equilibrium $F_A = F_L$, then:

$$\frac{I_B \alpha}{L_1} = \frac{I_A \alpha}{L_2}$$

and $$I_B = I_A \frac{L_1}{L_2}$$

Where:

$\Sigma M_A$=sum of moments about the actuator axis 3C.

$\Sigma M_B$=sum of moments about the latch axis 9a1.

$I_A$=moment of inertia of the rotary actuator 5

$I_B$=moment of inertia of the rotary inertia latch 9a $\alpha$=angular acceleration $L_1$=moment arm of latch arm 9a2

$L_2$=moment arm of torque arm 5e

Should the balanced rotary actuator arm assembly 5 be jarred from parked position by rotary shock, the permanent magnet bias on the control arm 9a3 of the balanced rotary inertia latch 9a rotates the latch arm in a direction to bias the torque arm 5e to rotate the balanced rotary actuator arm assembly 5 back to parked position.

Static Friction and Skating Friction Forces

In discussing the response of the rotary disk drive system above, static and skating friction forces acting on the transducer were neglected. While not so stated, also neglected were the static friction and skating friction forces due to rotation between the disk and the disk drive support as may also occur in rotary shock $F_s$.

With regard to the latter, relative angular displacement between the disk assembly 3 and the support 1, in the presence of rotary shock, such as that caused by the shock or impact force $F_s$, causes displacement of the surface of the disk assembly 3 beneath the transducer in a direction toward the actuator pivot 5D. At the location on the disk whereat the transducer slider 5C1 makes contact, the longitudinal axis of the transducer slider 5C1, coinciding with the longitudinal axis of the balanced rotary actuator arm assembly 5, is skewed by an angle $\ominus$ with the tangent of the circle intercepting the center of the area of the slider 5C1. This angle is such that tangential static friction forces and the following skating forces (sliding friction) have components (a function of $\sin \ominus$) directed toward the hub 3b, serving to restrain the balanced rotary actuator arm assembly 5 in parked position with the limit stop pin 7b2 biased against the limit stop face ID.

Static friction and skating friction forces $F_D$ occurring during disk drive spinup to operational speed, act in a direction indicated by the arrow $F_D$. In motor power rotation, the disk assembly 3 rotates counterclockwise. Static friction forces and skating friction forces now have components, proportional to $\sin \ominus$, here lumped as a single force $F_D$, acting in a direction on the transducer slider 5C1 to rotate the balanced rotary actuator arm assembly 5 from parked position. The permanent magnet bias of the control arm 9a3 in the direction of the keeper 9a4, couples a force $F_L$ to the torque arm 5e at the bearing points 9a23 and 5e1 to retain the balanced rotary actuator arm assembly 5 in parked position. This function is aided by the permanent magnet force acting on the limit stop pin 7b2.

Operation of the Disk Drive

Figure 2:
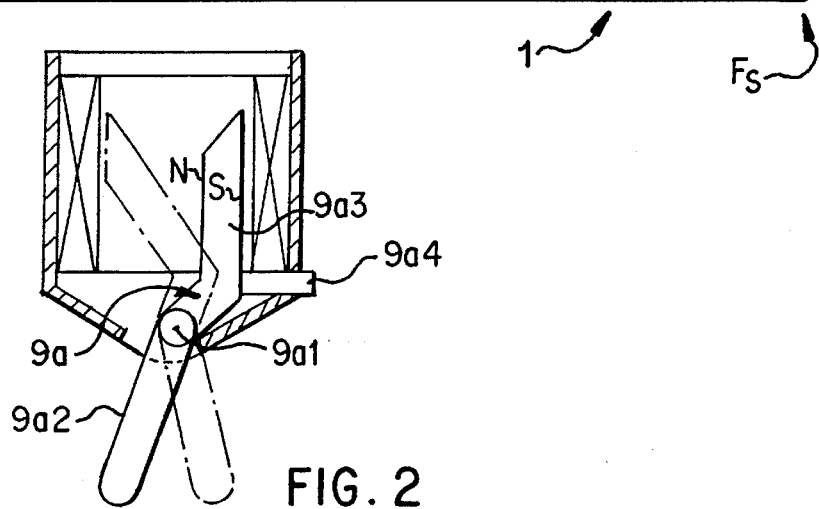
FIG. 2 is a view, partially in section, of the balanced rotary inertia latch of FIG. 1.

The balanced rotary actuator arm assembly 5 is not released by the balanced rotary inertia latch 9a until the disk assembly 3 is at operational speed and the axial gap actuator motor 7 has control of the balanced rotary actuator arm assembly 5. At this time, the coil 9b of the monostable inertial latch 9, is energized. The balanced rotary inertia latch 9a rotates to its unlatched position, as seen in FIGS. 2 and 3, clearing the torque arm 5e so that the balanced rotary actuator arm assembly 5 may rotate between its angular limits determined by the inner and outer limits stops ID and OD.

By the addition of the monostable inertia latch 9, employing a balanced rotary inertia latch 9a, which is mechanically coupled to the balanced rotary actuator arm assembly 5, via the latch arm 9a2 and the torque arm 5e, the shock energy tending to unseat the balanced rotary actuator arm assembly 5 now becomes the source of energy, via the balanced rotary inertial action 9a, to secure the rotary actuator 5 in parked position. Angular displacement of the balanced rotary actuator arm assembly, for any reason, from parked position, during periods when the balanced rotary inertial latch 9a is functional in latched position, results in a bias on the torque arm 5e by the latch arm 9a2 tending to return the balanced rotary actuator arm assembly 5 to the parked position. This action is aided in some degree by the latch bias provided by the force of the permanent magnet torque field acting on the limit stop pin 7b2.

What is claimed:

1. A disk drive comprising:
   a. a support;
   b. a disk assembly rotatably mounted to said support for rotation about a disk axis;
   c. a balanced rotary actuator arm assembly rotatably mounted to said support for rotation about an actuator axis to and from a parked position relative to said disk assembly;
   d. an actuator bearing point on said balanced rotary actuator arm assembly displaced from said actuator axis;
   e. a balanced rotary inertia latch rotatably mounted to said support, said balanced rotary inertia latch having a latch axis, a latched position, and an unlatched position;
   f. a latch bearing point on said balanced rotary inertia latch displaced from said latch axis;
   g. means for rotating said balanced rotary inertia latch from said latched position to said unlatched position about said latch axis;
   h. means for rotating said balanced rotary inertia latch from said unlatched position to said latched position about said latch axis; and
   i. means for mechanically engaging said latch bearing point to said actuator bearing point, when said means for rotating said balanced rotary inertia latch from said unlatched position to said latched position moves said balanced rotary inertia latch to said latched position and said balanced rotary actuator arm assembly being in said parked position, so that in the presence of angular acceleration and rotation of said support, the inertia force of said balanced rotary actuator arm assembly acting at said actuator bearing point being opposed and balanced by the inertia force of said balanced rotary inertia latch acting at said latch bearing point, forcing said balanced rotary actuator arm assembly and said balanced rotary inertia latch to rotate with said support.

2. The disk drive according to claim 1, in which:
   a. the distance between said actuator bearing point and said actuator axis defines a torque arm on said balanced rotary actuator arm assembly and the distance between said latch bearing point and said latch axis defines a latch arm on said balanced rotary inertia latch, said torque arm and said latch arm projecting toward each other, said latch arm having a predetermined length between said latch axis and said latch bearing point thereon and said torque arm having a predetermined length between said actuator axis and said actuator bearing point thereon, so that in the presence of angular acceleration of said support the inertia forces are in balanced opposition where said bearing points are engaged.

3. The disk drive according to claim 2, in which:
   a. the moment of inertia of said balanced rotary inertia latch is proportional to the product of the moment of inertia of said balanced rotary actuator arm assembly and the ratio of the length of the latch arm to the length of the torque arm.

4. The invention according to claim 3, wherein:
   a. said means for rotating said balanced rotary inertia latch from said latched position to said unlatched position includes an electromagnetic means for rotating said balanced rotary inertia latch about said latch axis from said latched position to said unlatched position, in which position said latch arm remains disengaged from said torque arm throughout the range of angular movement of said balanced rotary actuator arm assembly about said actuator axis.

5. The disk drive according to claim 4, in which said balanced rotary inertia latch comprises:
   a. a control arm connected to said latch arm in a position substantially diametrically disposed of said latch arm with respect to said latch axis; and
   b. said means for rotating said balanced rotary inertia latch from said unlatched position to said latched position including a permanent magnet mounted to said control arm for biasing said balanced rotary inertia latch to said latched position, said electromagnetic means, when energized, producing an electromagnetic field linking said permanent magnet and rotating said balanced rotary inertia latch about said latch axis to said unlatched position.

6. A disk drive, comprising:
 a. a support;
 b. a disk assembly comprising a hub and at least one disk on said hub;
 c. means for rotatably mounting said disk assembly on said support for rotation about a disk axis;
 d. a balanced rotary actuator arm assembly having a longitudinal axis and a balance point;
 e. means for mounting said balanced rotary actuator arm assembly to said support for angular movement about an actuator axis through said balance point, said actuator axis is substantially perpendicular to said longitudinal axis, said balanced rotary actuator arm assembly having a first distal end;
 f. a transducer mounted on said first distal end for scanning said disk as said balanced rotary actuator arm assembly moves angularly about said actuator axis, said balanced rotary actuator arm assembly having a parked position about said actuator axis with said transducer engaging said disk adjacent said hub;
 g. a torque arm projecting from one side of said balanced rotary actuator arm assembly, said torque arm having a second distal end and a bearing point adjacent said second distal end defining a torque moment arm between said actuator axis and said bearing point;
 h. a monostable inertia latch including a balanced rotary inertia latch having a latch axis, a monostable latched position, and an unlatched position, said balanced rotary inertia latch rotatably mounted on said support;
 i. said balanced rotary inertia latch comprising a latch arm and a control arm substantially diametrically disposed of said latch axis, said latch arm having a bearing point displaced from said latch axis defining a latch moment arm;
 j. a means for rotating said balanced rotary inertia latch from said monostable latched position to said unlatched position about said latch axis;
 k. a means for rotating said balanced rotary inertia latch from said unlatched position to said monostable latched position about said latch axis;
 l. when said balanced rotary actuator arm assembly is in said parked position, said means for rotating said balanced rotary inertia latch from said unlatched position to said monostable latched position moves, said balanced rotary inertia latch to said monostable latched position, and said latch arm engages said bearing point of said torque arm at said bearing point of said latch arm, wherein said balanced rotary inertia latch has a moment of inertia proportional to the product of the moment of inertia of said balanced rotary actuator arm assembly and the ratio of the length of said latch moment arm to the length of the said torque moment arm which, in the presence of angular acceleration of said support in a direction to cause relative displacement between said balanced rotary actuator arm assembly and said disk assembly, produces a force, acting on said torque arm where said torque arm and said latch arm bearing points are engaged, being opposed to and at least equal to the torque arm force there at during said angular acceleration.

7. The disk drive according to claim 6, in which said means for rotating said balanced rotary inertia latch from said unlatched position to said monostable latched position comprises:
 a. permanent magnet means including said control arm for biasing said control arm in a direction about said latch axis to move said balanced rotary inertia latch to said monostable latched position.

8. The disk drive according to claim 7, in which said permanent magnet means comprises:
 a. a permanent magnet on said control arm.

9. The disk drive according to claim 7, comprising:
 a. a coil on said monostable inertia latch having a magnetic field linking said control arm for rotating said balanced rotary inertia latch to unlatched position when said coil is energized, said permanent magnet means rotating said balanced rotary inertia latch to latched position when said coil is deenergized.

10. A disk drive, comprising:
 a. a support;
 b. a disk assembly rotatably mounted to said support for rotation about a disk axis;
 c. a balanced rotary actuator arm assembly rotatably mounted to said support for rotation about an actuator axis to and from a parked position relative to said disk assembly;
 d. means for rotating said balanced rotary actuator arm assembly to said parked position;
 e. a balanced rotary inertia latch mounted to said support, said balanced rotary inertia latch having a latch axis, a latched position, and an unlatched position;
 f. means for rotating said balanced rotary inertia latch from said latched position to said unlatched position about said latch axis;
 g. means for rotating said balanced rotary inertia latch from said unlatched position to said latched position about said latch axis;
 h. an actuator bearing point on said balanced rotary actuator arm assembly displaced from said actuator axis defining a torque arm with respect to said actuator axis;
 i. a latch bearing point on said balanced rotary inertia latch displaced from said latch axis defining a latch arm with respect to said latch axis;
 j. when said means for rotating said balanced rotary inertia latch from said unlatched position to said latched position moves said balanced rotary inertia latch to said latched position and said balanced rotary actuator arm assembly is in said parked position, said latch arm projecting toward said torque arm engages said latch bearing point with said actuator bearing point in mechanical force opposition in the presence of angular acceleration of said support in an angular direction to displace said balanced rotary actuator from said parked position, the ratio of the length of said latch arm to the length of said torque arm provides equal forces which are opposed at the point of engagement of said actuator bearing point with said latch bearing point.

11. A disk drive, comprising:
 a. a support;
 b. a disk assembly rotatably mounted to said support for rotation about a disk axis;
 c. a balanced rotary actuator arm assembly rotatably mounted to said support for rotation about an actuator axis and disposed in a parked position relative to said disk assembly;

d. an actuator bearing point displaced from said actuator axis on said balanced rotary actuator arm assembly defining an actuator moment arm between said actuator bearing point and said actuator axis;

e. a balanced rotary inertia latch mounted to said support, said balanced rotary inertia latch having a latch axis, a latched position, and an unlatched position, said balanced rotary inertia latch being disposed in said latched position on said support;

f. a means for rotating said balanced rotary inertia latch from said latched position to said unlatched position about said latch axis;

g. a means for rotating said balanced rotary inertia latch from said unlatched position to said latched position about said latch axis;

h. a latch bearing point displaced from said latch axis on said balanced rotary inertia latch defining a latch moment arm between said latch bearing point and said latch axis; and i. means for engaging said actuator bearing point with said latch bearing point, when said means for rotating said balanced rotary inertia latch from said unlatch position to said latched position moves said balanced rotary inertia latch to said latched position and said balanced rotary actuator arm assembly is in said parked position, so that the forces at said engaged bearing points are in opposition when said support is angularly accelerated in an angular direction to angularly displace said balanced actuator arm assembly from said parked position, the ratio of the length of said latch moment arm to the length of said actuator moment arm providing equal forces at said actuator bearing point and said latch bearing point.

* * * * *